UNITED STATES PATENT OFFICE.

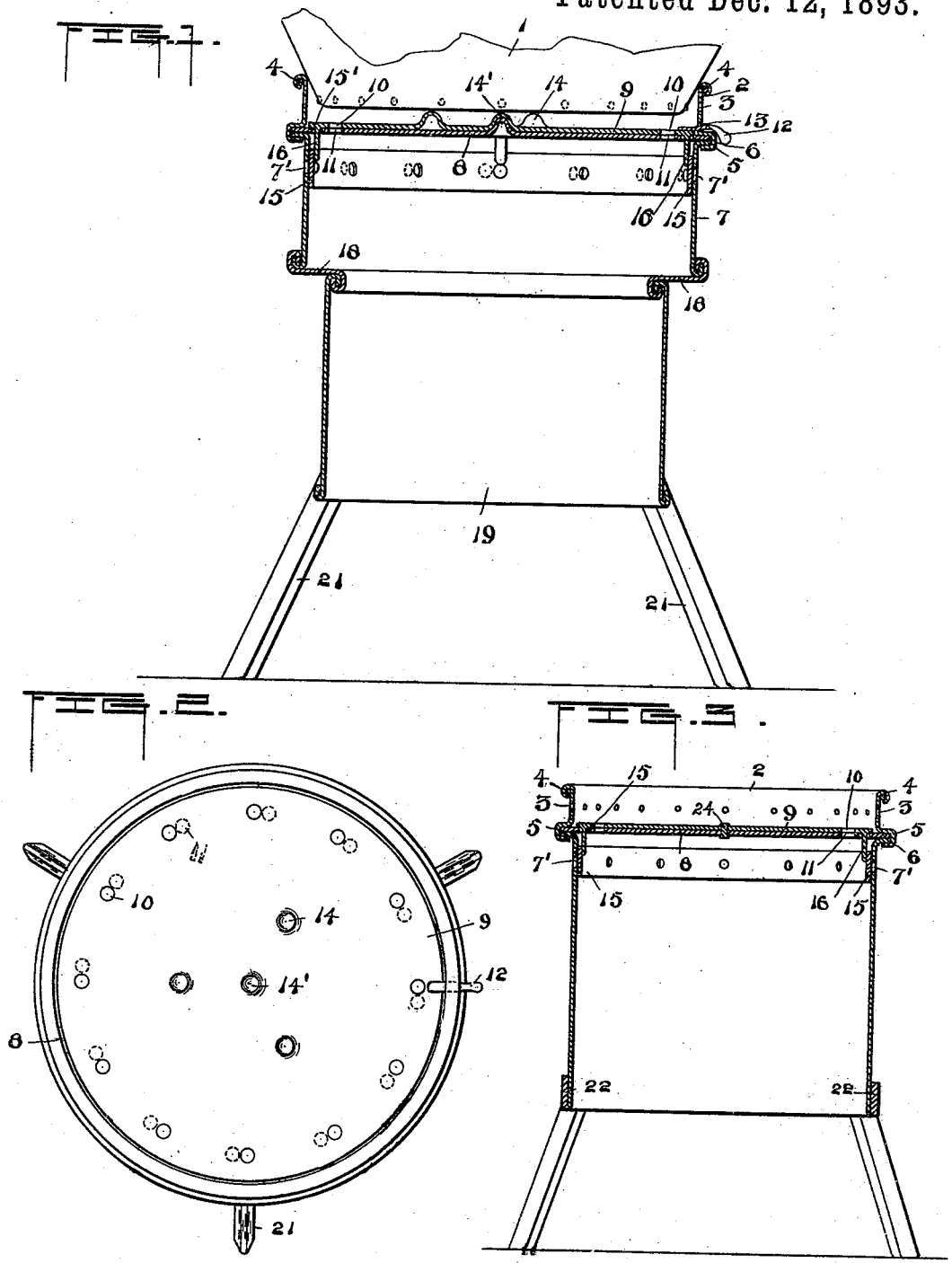

ANDREW J. GRUSH AND HENRY B. SOOY, OF DEFIANCE, IOWA.

BREAD-RAISER.

SPECIFICATION forming part of Letters Patent No. 510,536, dated December 12, 1893.

Application filed May 10, 1893. Serial No. 473,697. (No model.)

*To all whom it may concern:*

Be it known that we, ANDREW J. GRUSH and HENRY B. SOOY, of Defiance, in the county of Shelby and State of Iowa, have invented certain new and useful Improvements in Bread-Raisers; and we do hereby declare the following to be a full, clear, and exact description of the invention, such as will enable others skilled in the art to which it pertains to make and use the same.

This invention relates to devices for warming dough to promote fermentation therein commonly called "bread raisers," and it has for its object to increase the efficiency and economy of such articles while providing for a thorough control of their operation; and it consists in the construction hereinafter described and particularly pointed out.

In the accompanying drawings Figure 1 is a vertical central section. Fig. 2 is a side elevation; and Fig. 3 is a section of a modified form.

Numeral 1 indicates a bread or dough pan of usual form supported upon a ring 2 having perforations 3. This ring is provided with a rim 4 on its upper edge, which may be wired, and on its lower edge it has a bead 5 adapted to receive and hold the out-turned flange 6 of a cylinder 7 and also the circumferential edge of a disk 8. The ring and cylinder may be soldered together at the joint if desired.

9 denotes a movable disk provided with holes 10 which are adapted to register with or cover holes 11 in the fixed disk 8. A handle 12 fixed to the disk 9 projects through a slot 13 in the ring. The holes 11 can be covered or uncovered by partially rotating disk 9 by means of its handle.

14 indicate bosses which may be formed in disk 9 to insure that the pan shall not in any case sit down close and flat on said disk and close its openings and also to provide an air or gas space between said disk and pan to prevent the over-heating of the pan bottom and particularly of its central part. The central boss 14' can be further utilized as a socket to receive a similar boss on the fixed disk 8 which constitutes a pivot about which disk 9 is partially turned.

In some cases it is proposed to provide cylinder 7 with a series of holes 7' adapted to be opened or closed by an inner perforated ring 15 connected by arms 16 to the disk 9 and adapted to be moved with it, the arrangement being such that when the holes 11 are entirely closed the holes 7' will be open with the effect to permit the escape of warm air and products of combustion therethrough.

15' indicate slots in disk 8 to permit the circumferential movement of the arms 16. The cylinder 7 is attached by a horizontal flange 18 to a smaller cylinder 19 which latter is provided with supporting legs 21. These are of such length that an ordinary hand lamp can be easily placed under the device at rest.

A further object of legs or equivalent supports of considerable height is to provide for the free and abundant entrance of air induced by the lighted lamp. Such air mingles with the products of combustion from the lamp and being warmed thereby is expanded in cylinders 19 and 7 and escapes upwardly through holes 11 and 10 coming in contact with the bottom and sides of the pan seated on or in ring 2.

It is important that a large quantity of air be thus induced to enter the cylinders and mix with the hot products to avoid overheating dough. It is further important that the dough pan be raised above the disks 8 and 9 as set forth to avoid too great heating of the bottom of the pan and of its contents by reason of the great conductivity of the metal. For a somewhat similar reason means are provided for closing the holes in disks 8 and 9 partially or wholly and opening holes 7' in cylinder 7 to direct the warm air outwardly at points below the exits 3. Air which escapes through holes 7' will be partially deflected by the bead 5 and will also be mixed with cooler air so that its effect upon the exterior of the bread pan will be considerably modified. This latter adjustment of the escape ports though not essential to all the advantages of our improvement is very suitable for mild weather or in case the heat of the lamp is too great for properly raising the dough. This requires an equable temperature of moderate degree varying somewhat with the time devoted to raising and with the character of the dough and ferment. But under all circumstances it is desirable to be able to regulate nicely the temperature to which it is subjected. This cannot well be done by regulating the lamp flame as such regulation is limited by the liability of producing a smoky flame and by the capacity of the lamp.

The construction whereby the pan is prevented from resting flatly on disk 9 and the other characteristics of our device whereby the warm currents are controlled and diverted combined with the high open supports and large air inlet enable us if desired to use a comparatively short single cylinder such as shown in Fig. 3. This is provided with a bead 5 in which disk 8 may be secured and has also the other essential adjuncts of the device. It is shown supported on a ring 22 having suitable legs. This supporting ring may be made of cast metal and the cylinder and other parts may be made of tin or other sheet metal or they may be cast as found convenient.

As shown in Fig. 3, 24 is a loose rivet which constitutes a pivot for the disk 9.

It is obvious that a body for our "raiser" consisting of a single cylinder will be more easy to manufacture than one composed of two cylinders and a ring joined together. The latter however if made of sheet metal can be made of less materal with an equal degree of strength. It is further obvious that the number and size of exit holes may be varied and that other means of supporting the article above a flame with a free inlet for air can be employed without departing from the invention.

Having thus fully described our invention, what we claim is—

1. In a dough raiser the body open at the bottom and provided with supporting legs and with a flange 6, the perforated disks 8 and 9, said disk 8 and flange 6 being clamped by the walls of the bead 5, and means to make the perforations in the disks register at will and a perforated supporting ring having said bead and extending above the disks and adapted to receive a bread pan, substantially as set forth.

2. The herein described dough raiser having a body open at the bottom and provided with supporting legs and having the perforated disks 8 and 9, means to make the perforations register at will and a perforated supporting ring above the disks adapted to receive the bread pan, said disk 9 having bosses formed therein to support the pan bottom, substantially as set forth.

3. The herein described dough raiser having a body open at the bottom and provided with supporting legs and having the perforated disks 8 and 9, means to make the perforations register at will and a perforated supporting ring above the disks adapted to receive a bread pan, said disks having central bosses acting respectively as a pivot and a socket, substantially as set forth.

4. The herein described dough raiser having a body open at the bottom and provided with supporting legs and having the perforated disks 8 and 9, the perforated cylinder, the perforated ring 15, means to make the perforations in the disks and in the cylinder and ring to register alternately at will and a perforated supporting ring above the disks adapted to receive a bread pan, substantially as set forth.

In testimony whereof we have signed this specification in the presence of two subscribing witnesses.

ANDREW J. GRUSH.
HENRY B. SOOY.

Witnesses:
A. S. RILEY,
THOS. E. HOLMES.